Nov. 9, 1965     D. L. CHRISTEN ETAL     3,216,154
METHOD OF FORMING SMALL GLASS ENVELOPES, BEADS AND THE LIKE
Filed June 7, 1961                                2 Sheets-Sheet 1
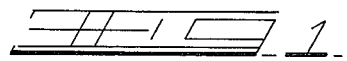
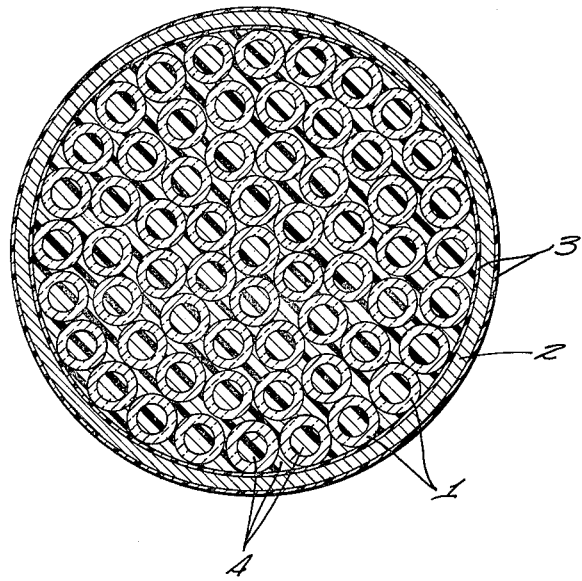
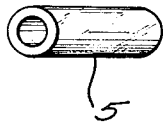
INVENTORS
D. L. CHRISTEN
C. C. CIPRIANI
BY R. G. RUSSELL
W. A. SCHAICH &
E. J. HOLLER
ATTORNEYS Nov. 9, 1965   D. L. CHRISTEN ETAL   3,216,154
METHOD OF FORMING SMALL GLASS ENVELOPES, BEADS AND THE LIKE
Filed June 7, 1961   2 Sheets-Sheet 2

INVENTORS
D. L. CHRISTEN
C. C. CIPRIANI
BY   R. G. RUSSELL
W. A. SCHAICH
& E. J. HOLLER

ATTORNEYS

United States Patent Office 3,216,154
Patented Nov. 9, 1965

3,216,154
METHOD OF FORMING SMALL GLASS
ENVELOPES, BEADS AND THE LIKE
David L. Christen and Chester C. Cipriani, Toledo, and Richard G. Russell, Sylvania, Ohio, assignors, by mesne assignments, to Owens-Illinois Glass Company, Toledo, Ohio, a corporation of Ohio
Filed June 7, 1961, Ser. No. 115,576
1 Claim. (Cl. 51—283)

The present invention relates to the conversion of lengthy glass elements such as tubes into individual short segments, and more particularly to a method of cutting relatively small diameter glass tube into diminutive electronic envelopes, beads or the like having substantially uniform size and shape.

In the manufacture of small electronic devices such as diodes, triodes, resistors, semi-conductors, etc., it is conventional practice to position the working elements of the particular device within a small glass envelope which serves to permanently encapsulate and support the working elements in prescribed relation. One common type of such envelopes are referred to as diode bodies or diode beads. In order to provide some indication of size, the envelopes may number as many as 20,000 to 70,000 pieces per one-half pound depending upon the particular devices involved.

In manufacturing such miniaturized devices having high performance characteristics, it is imperative that uniformity of envelope size and shape be maintained within rigid specifications, particularly in view of the fact that such devices are frequently made by automatic or semi-automatic processes. In order to attain satisfactory fabrication of the completed devices, it is necessary that the envelopes have square-cut end surfaces and be free from impurities which may contaminate and thus prevent satisfactory operation of the completed device.

In view of the extremely small sizes of the subject envelopes it is most uneconomical and time-consuming to cut separate lengths of glass tubing either manually or individually. Such individual operations frequently result in a considerable number of the envelopes having chipped, cracked or irregular edges which cannot be tolerated in fabricating the said electronic devices. It is quite necessary for purposes of economy and expediency in making the particular envelopes having the requisite precise dimensions that a plurality of similar tubes be simultaneously severed. Further, in cutting a plurality of tubes the severed sections must be cut cleanly and smoothly to minimize inspection procedures and loss of product due to having chipped or broken edges.

One method which has been employed heretofore in cutting glass beads which function as lead wire supports in electron discharge tubes is disclosed in Patent No. 2,436,819 to Neidorf, issued March 2, 1948, entitled "Method of Forming Glass Beads." This disclosure pertains to forming glass beads having uniform size and shape free from flaws such as chipped or cracked edges, but is particularly directed to forming relatively large segments having a length substantially in excess of ⅛ inch. The method disclosed by this patentee is inapplicable to forming extremely short-length glass segments such as those having a length of ⅛ inch or less without producing the aforesaid flaws. Cutting glass tubing into substantially greater lengths does not compare in difficulty to cutting shorter lengths due to retention problems and the increased tendency of such flaws to occur in extremely short lengths. The present invention is directed to overcoming such inherent difficulties in the method of this patentee.

Accordingly, it is an object of the present invention to provide a novel method of forming short-length envelopes, beads, cylindrical bodies or the like from lengthy sections of glass tubing by simultaneously cutting a plurality of similar glass tubes into relatively small individual segments.

Another object of the invention is to provide an expedient method of forming diminutive glass envelopes or the like having precise contours by retaining a plurality of glass tubes within a water-insoluble container, the individual tubes being constrained rigidly by solidified water-soluble synthetic polymer which prevents their movement or vibration during the cutting operation while a non-solute cooling liquid is delivered over the solidified assembly.

Another object of this invention is to provide a unique method of severing lengthy sections of small diameter glass tubes into short-length individual electronic envelopes and the like having uniform surfaces and dimensions by retaining the tubes with solidified water-soluble synthetic polymer and performing the severing operation while delivering the cooling liquid over the assembly, the polymer being insoluble in the cooling liquid.

A further object of this invention is to provide an economical method of forming extremely small sizes of glass envelopes or beads having precisely uniform contours and an overall length not exceeding ⅛ (0.125) inch.

A still further object of this invention is to provide a method of expeditously forming from glass tubing considerable quantities of extremely short-length small-diameter envelopes or beads which have square-cut defect-free regular edges.

The specific nature of this invention, as well as other objects and advantages will become apparent to those skilled in the art from the following detailed description taken in conjunction with the annexed sheet of drawings on which, by way of preferred example only, is illustrated the preferred embodiment of this invention.

On the accompanying drawings:

FIG. 1 is a side view of an individual glass tube before severing.

FIG. 2 is a cross-sectional view of a plurality of such glass tubes disposed in coparallel relation within a suitable cylindrical container.

FIG. 3 is a side view of an individual newly-severed glass envelope.

Figure 4:
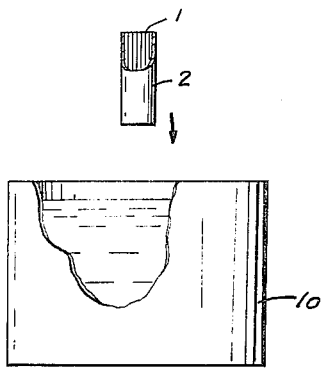
FIG. 4 is a part sectional diagrammatic view showing the introduction of melted synthetic polymeric material into a container containing glass tubes.

The present invention may be briefly described as utilizable in the production of resistor cases, diode bodies, diode beads or other small glass parts by precision cutting relatively thin slices from suitable bundles of lengthy glass elements such as tubes. The bundles employ a water-soluble synthetic wax polymer to constrain a plurality of individual glass tubes in fixed relationship for severing, the whole being encased in an inexpensive paperboard container which has been previously impregnated with a coating material having a higher melting point than the tube constraining wax polymer and relatively low solubility in water. The water solubility of the water-soluble "potting" wax is important to facilitate cleaning of the severed sections or envelopes by a series of water and detergent baths and makes such operations as vapor degreasing, which would be necessary where hydrocarbon waxes are used, both unnecessary and undesirable. In severing segments having an overall length not exceeding ⅛ inch, a petroleum oil fraction is conveniently employed as a coolant for an abrasive wheel which is employed as the severing means. The use of a cooling oil in which the synthetic wax is relatively insoluble is necessary so that normal wash-back of the tube retaining wax during cutting is prevented so that the individual glass tubes cannot shift or vibrate.

The present method is practiced by essentially placing a plurality of glass elements 1 such as lengthy glass tubes having essentially similar internal and external diameters within a readily severable cylindrical container 2. The tubes are taken in the form of a cylindrical bundle with their lineal axis coparallel and fitted into the container. Obviously the glass elements may have slightly varying diameters although for this invention it is preferred that the tubes have cross-sectional dimensions within precise dinmensional ranges. The length of the tubes may be varied although it is preferred that about 18″ lengths lengths having a bow not exceeding ⅛ (0.125) inch may be utilized in forming diode parts to avoid forming angularly cut ends.

Container 2 is preferably a paperboard cylinder such as a relatively large diameter mailing tube having sufficient strength to avoid its distortion upon fitting bundles of glass tubes therewithin. The paperboard container consists of a four-ply spirally wound tube having a kraft paper liner and preferably is about 20 inches in length with an internal diameter of about 2.5 inches.

The paper container is capped at one end by a tightly-fitting metallic cap (not shown) to seal one end thereof. Container 2 is coated over both its exterior and interior surfaces with a water-insoluble material 3 which penetrates the pores of the paper and serves to both strengthen and waterproof the container. In order to obtain satisfactory cutting, the paper tube is preferably impregnated with relatively water insoluble polyethylene. No. 629 polyethylene wax, distributed and sold by Allied Chemical Corporation, for example, is used to coat and impregnate the paper tube. The tube is introduced into this wax in molten condition having a temperature ranging from 400° to 450° F., and retained therein for 30 minutes or until essentially all bubbling ceases. The capped end may have an opening formed therein to facilitate tube impregnation after which such opening is sealed.

The fully inspected lengths of glass tubing are then packed tightly within cardboard container 2 for potting and cutting. However, in order to obtain cuts which are precisely right-angled within one degree (1°) angular configuration as frequently required for diode parts, certain precautions must be observed in pushing the glass tubes within the outer container. The interior surfaces of the paperboard container are coated with a solution of water-soluble waxy material 4. This solution preferably consists of about 2 ounces of #4000 "Carbowax" per quart of boiling distilled water. This material may be chemically described as polyethylene glycol ranging in molecular weight from 200 to 20,000 and is relatively soluble in water. After coating the interior of container 2 the excess water-soluble wax solution is permitted to drain away by standing the tubular container on end for a brief period. A cylindrical bundle of glass tubing lengths is then inserted into the container using care to be certain that the glass elements are all straight and parallel. The bundle of glass elements is pushed into the cardboard container with care to avoid twisting or disrupting the parallel disposition of the glass tubes. The tubes are pushed completely into the carboard container until all individual lengths are stopped by contact with the closed end provided by the aforesaid metallic cap. Thus, the axes of the individual glass elements are disposed parallel to each other as well as parallel to the container axis throughout their longitudinal extent.

Figure 5:
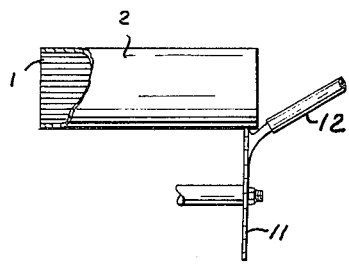
FIG. 5 is a part of sectional diagrammatic view showing the cutting of the rigid mass of glass tubes and solidified synthetic polymeric material with an abrasive wheel while simultaneously cooling the abrasive wheel with liquid coolant.
Figure 6:
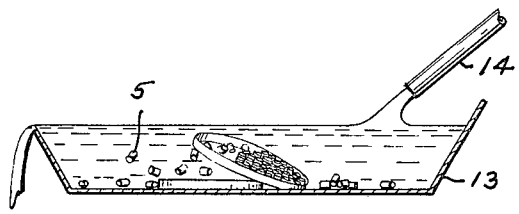
FIG. 6 is a part sectional diagrammatic view showing the washing of the severed section.
Figure 7:
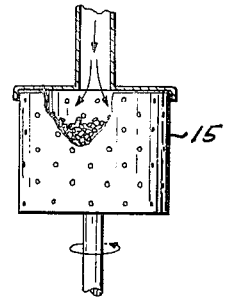
FIG. 7 is a part of sectional diagrammatic view showing the drying of the beads.

FIGS. 4–7 are diagrammatic drawings showing various succeeding steps in the method. Cardboard container 2 which is substantially filled with the glass elements is then submerged in a tank (FIG. 4) of molten water-soluble wax 4 such as Carbowax #4000 at about 175° F. The waxing of the filled container is conducted for a period of from 15 to 30 minutes. In order to purge all of the voids and interstices between the glass tubes and the container interior of air, when bubbling is observed to have ceased the container is raised out of the molten wax and the excess is permitted to drain away.

Following the introduction of the water-soluble wax into the container to fill all of the interior air-space the paperboard container is lowered into a tank of cooling water in upright position to cool and congeal the potting waxy material 4. The cooling is conducted for a sufficient period to solidify the potting wax and normally takes about one hour. Longer exposure of the impregnated paperboard container to water is inadvisable as the impregnating material used on the paperboard is not completely water-insoluble.

The solidified assembly of the container carrying the individual glass elements in rigid relation supported by the water-soluble potting material is then taken to a cutting operation. A diamond wheel 11 (FIG. 5) is preferably employed as the severing means. In cutting glass parts or envelopes having a lineal dimension not exceeding ⅛ inch, a compounded hydrocarbon oil is utilized to cool the abrasive wheel since during the cutting of such lengths the normal back-wash of the water-soluble potting material by a coolant such as water leaves an insufficient length of wax to retain the glass tubes properly for accurate cutting. Petroleum oil fractions such as "Sun Rolling Mill Oil X Light" distributed by Sun Oil Company is useful for cooling the abrasive wheel. In cutting a plurality of slices of the container the cutting oil must be replaced as soon as abrasive particles are detected on the cut slices. Such condition of the cutting oil results in dimensional inaccuracies during the cutting operation. The liquid coolant can be supplied through a suitable nozzle 12.

The wax cut slices of severed parts are submerged in boiling water in a pan 13 (FIG. 6) for about five minutes and then rinsed with boiling water from a nozzle 14 which is sprayed over the slices to flush the contaminated solution and glass particles away from the severed parts. The individual parts are thus separated from the sliced units and then further washed in a detergent solution after which they are again flushed with boiling water.

The parts 5 are finally washed in boiling distilled water and subjected to additional cleaning procedures as known in the art. The parts are subjected to ultrasonic cleaning in 20% by weight acetic acid solution followed by a distilled water rinse. The parts are dried preferably by centrifuging in a centrifuge 15 (FIG. 7) to remove the water and then are placed in a filtered air drier at about 175° F. After drying the parts are inspected preferably under 10 power magnification using a black matte background to determine cleanliness of the product. Presence of any foreign material indicates that further cleaning procedures are required.

The completed products exhibit regular smoothly severed edges free from chips or breaks and suitable cleanliness for fabricating various miniaturized electronic devices.

Various modifications may be resorted to within the spirit and scope of the appended claims.

We claim:

The method of simultaneously severing a plurality of lengthy small-diameter glass tubes into a series of small short-length beads having a length of about ⅛ inch or less and precisely uniform size and shape for use as electronic envelopes, said method comprising the steps of
  arranging a plurality of lengthy small-diameter glass tubes in precisely parallel relation within a suitable waterproof container to substantially fill the cross-section thereof,
  introducing melted water-soluble synthetic polymeric material comprising a high molecular weight polymer of ethylene glycol into the container to fill all interstices between the glass tubes and inner surfaces of the container,
  cooling the melted water-soluble synthetic polymeric material to solidify the same into a rigid mass comprising said glass tubes bonded together by the solidified synthetic polymeric material,
  cutting through said rigid mass transversely with an abrasive wheel to sever a flat section having a thickness of about ⅛ inch or less and simultaneously cooling said wheel with a liquid coolant comprising a hydrocarbon cutting oil fraction in which said synthetic polymeric material is relatively insoluble,
  subsequently washing the severed section with water to separate the short-length beads comprising the interior of said severed section from one another and to remove the polymeric material from the individual beads,
  and drying said beads.

References Cited by the Examiner
UNITED STATES PATENTS

| | | | |
|---|---|---|---|
| 2,328,302 | 8/43 | Simison | 29—423 |
| 2,436,819 | 3/48 | Neidorf | 29—424 X |
| 2,607,714 | 8/52 | Smucker | 29—424 |
| 2,760,314 | 8/56 | Heibel et al. | 51—283 |

LESTER M. SWINGLE, *Primary Examiner.*

EARL M. BERGERT, *Examiner.*